United States Patent [19]

Williamson

[11] 4,258,880
[45] Mar. 31, 1981

[54] FIREPLACE HEATING SYSTEM WITH FINNED TUBES OR FIREPLACE GRATE

[75] Inventor: Ernest W. Williamson, Farmington, N. Mex.

[73] Assignee: Arlon L. Stoker, Farmington, N. Mex. ; a part interest

[21] Appl. No.: 937,858

[22] Filed: Aug. 29, 1978

Related U.S. Application Data

[63] Continuation-in-part of Ser. No. 695,538, Jun. 14, 1976, abandoned.

[51] Int. Cl.³ .............................................. F24D 3/00
[52] U.S. Cl. .................................... 237/56; 237/8 R; 237/19; 126/132; 126/164; 126/122
[58] Field of Search .................... 237/59, 8 R, 19, 56; 126/132, 164, 121, 122

[56] References Cited

U.S. PATENT DOCUMENTS

| 670,066 | 3/1901 | Smoak | 126/132 |
|---|---|---|---|
| 1,549,071 | 8/1925 | Dodge | 126/132 |
| 1,576,899 | 3/1926 | Clanton | 126/132 |
| 2,539,469 | 1/1951 | Powers | 237/19 |
| 2,849,185 | 8/1958 | Keyes | 237/8 R |
| 3,635,211 | 1/1972 | Englert | 126/121 |
| 3,945,369 | 3/1976 | Adams et al. | 126/164 |
| 3,958,755 | 5/1976 | Cleer, Jr. | 237/8 R |
| 4,046,320 | 9/1977 | Johnson et al. | 126/132 |

FOREIGN PATENT DOCUMENTS

| 1004182 | 4/1902 | France | 126/121 |
|---|---|---|---|
| 639468 | 3/1928 | France | 126/121 |
| 965964 | 8/1964 | United Kingdom | 126/132 |

OTHER PUBLICATIONS

Popular Mechanics, Oct. 1974, pp. 154-156, "Fireplace Furnace: Heating Your House".

*Primary Examiner*—Albert J. Makay
*Assistant Examiner*—Henry Bennett
*Attorney, Agent, or Firm*—Harvey B. Jacobson; Clarence A. O'Brien

[57] ABSTRACT

A fireplace heating system having a fireplace furnace connected to a heat transfer device and to a fluid source for heating a fluid received from the source and feeding heated fluid to the heat transfer device in order to heat a building, and the like, in which the heat transfer device is located. The furnace coils forming a grate and arranged extending in a tortuous path in vertically displaced, substantially horizontal planes and a substantially vertical plane extending between the horizontal planes for partially surrounding a fire built on the coils in order to achieve efficient heat transfer between the fire and the fluid being passed through the coils.

2 Claims, 6 Drawing Figures

FIREPLACE HEATING SYSTEM WITH FINNED TUBES OR FIREPLACE GRATE

CROSS-REFERENCE TO RELATED APPLICATION

This application is a continuation-in-part of application Ser. No. 695,538, filed June 14, 1976, now abandoned.

BACKGROUND OF THE INVENTION

1. Field of the Invention

This invention relates generally to fireplace heating systems, and particularly to a fireplace heating system suitable for use in heating residences, and the like, and employing a fireplace furnace of greatly improved efficiency.

2. Description of the Prior Art

In view of the various fuel shortages currently being felt, great attention is being directed to alternate methods of heating residences and other buildings. Further, many structure such as mountain cabins, ranch houses, and the like, are located in remote areas where there is no gas, and possibly no electricity, available for heating purposes other than liquefied petroleum gas (LPG) or fuel oil which sometimes must be hauled great distances. Accordingly, there is need for a system, such as that employing a fireplace furnace, which can be employed to heat such structures.

Examples of heating systems employing fireplace furnaces can be found in the prior art of record in Ser. No. 695,538 and in U.S. Pat. Nos. 373,333, issued Dec. 6, 1887, to Backus; 1,352,371, issued Sept. 7, 1920, to Kenney; 1,576,899, issued Mar. 16, 1926, to Clanton; 2,006,279, issued June 25, 1935, to Perry; 2,048,675, issued July 28, 1936, to Baruch et al; and 2,172,711, issued Sept. 12, 1939, to Newton. These proposed systems, and fireplace furnaces, set forth various approaches to meeting the problem of achieving efficient dwelling and other heating from a fireplace.

SUMMARY OF THE INVENTION

It is an object of the present invention to provide a fireplace heating system of simple yet reliable construction which will effectively and efficiently heat a dwelling or other structure.

It is another object of the present invention to provide a fireplace heating system employing therein a fireplace furnace of simple, yet rugged and efficient construction.

It is yet another object of the present invention to provide a heating system which efficiently permits balancing of a plurality of heat transfer devices so as to obtain uniform heating over a structure being heated.

These and other objects are achieved according to the present invention by providing a fireplace heating system having: a fireplace furnace arrangeable in a fireplace for heating a fluid passing through the furnace and heating the fluid; a fluid storage structure connected to the furnace for feeding fluid to the furnace; and a heat transfer arrangement connected to the furnace for receiving heated fluid from the furnace and heating a space in which the heat transfer arrangement is disposed.

The heat transfer arrangement advantageously is a radiator connected to the fluid storage structure, which is preferably in the form of a tank or similar container, for returning the fluid to the fluid storage structure and storing and recycling the fluid while forming a closed system amongst the furnace, fluid storage structure, and the heat transfer arrangement.

The heat transfer arrangement preferably includes a plurality of radiators, and the like, and a like number of lines connected in parallel with the radiators so as to bypass the radiators for permitting the adjustment of fluid flow through the system in order to assure that the system will be balanced and the structure being heated will receive heat uniformly from the plurality of radiators. Further, suitable valves, such as thermostatic valves can be employed with the bypass lines in order to obtain an automatic control system.

The fireplace furnace is preferably constructed from a continuous member bent into a plurality of coils disposable above a hearth of a fireplace for forming a tortuous flow path of the fluid medium through the fireplace so as to assure efficient heating of the fluid. Further a portion of the coils is advantageously arranged in a horizontal plane, another portion of the coils is arranged in a substantially vertical plane, and a third portion of the coils is arranged in a second substantially horizontal plane above the first portion of coils, so as to partially surround a fire built on the coils, which cooperate to form a grate, in order to increase the effective surface area of the coils exposed to the fire.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
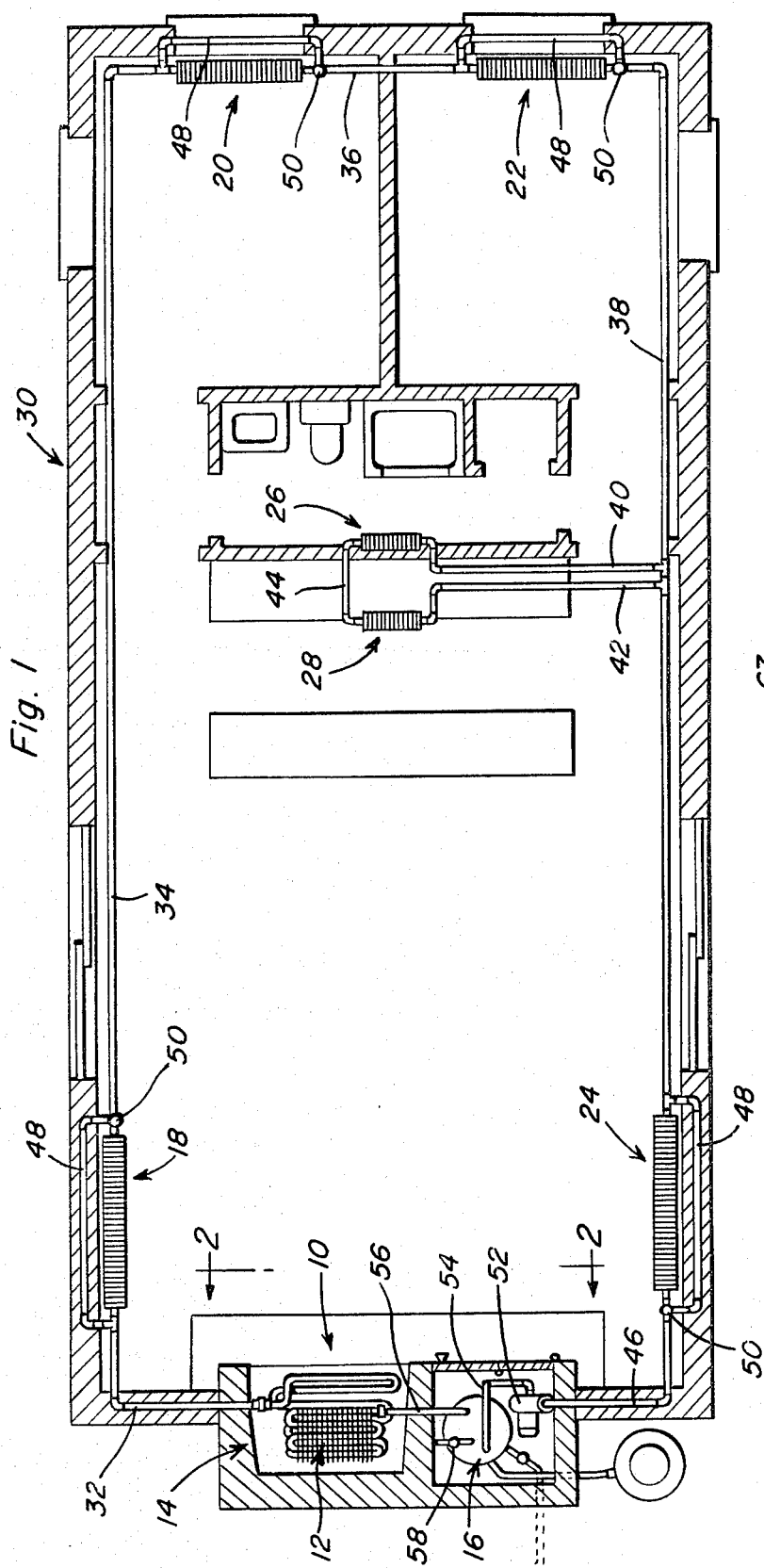
FIG. 1 is a plan part sectional view of a structure provided with a fireplace heating system according to the present invention.
Figure 2:
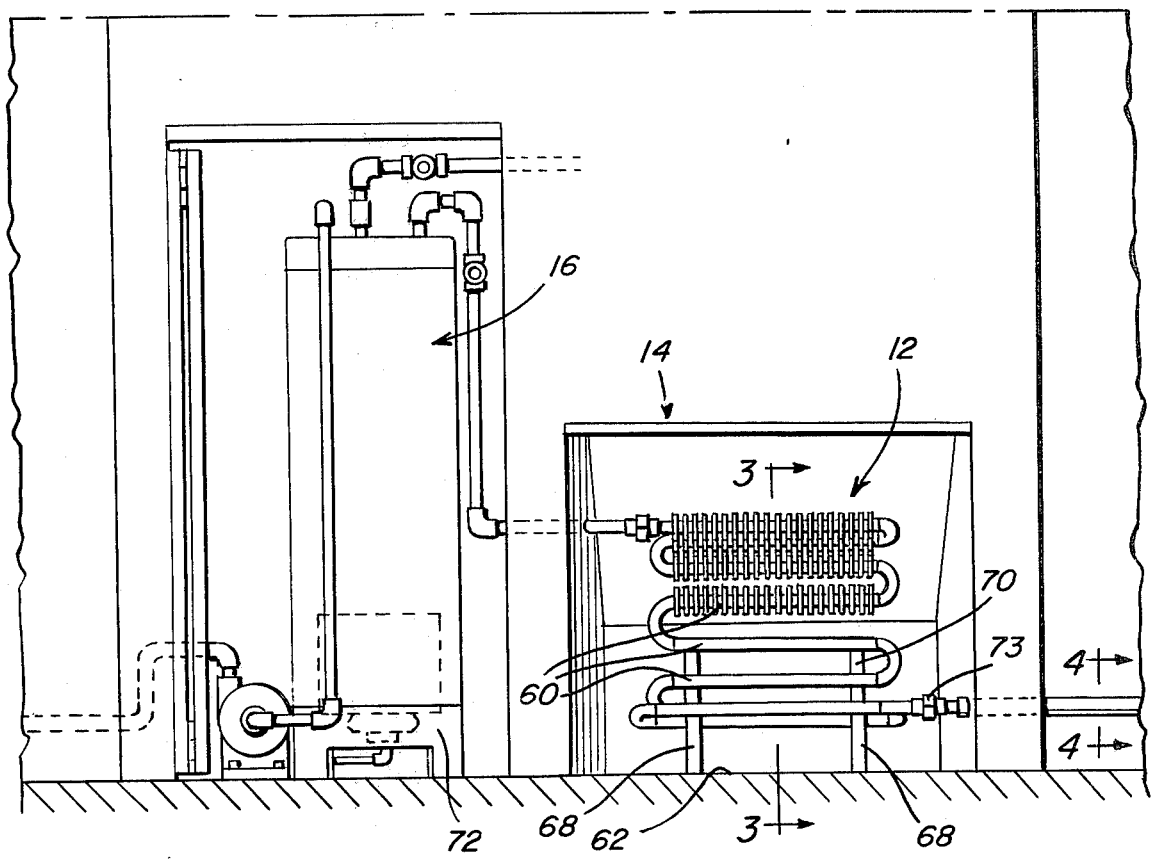
FIG. 2 is a fragmentary, enlarged, sectional view taken generally along the line 2—2 of FIG. 1.

Referring now more particularly to FIGS. 1 and 2 of the drawings, a fireplace heating system 10 according to the present invention includes a fireplace furnace 12 arranged in a fireplace 14 for heating a fluid, such as water, passing through the furnace 12. A fluid storage source in the form of a tank 16 is connected to furnace 12 for feeding fluid thereto, while a heat transfer arrangement in the form of a plurality of radiators 18, 20, 22, 24, 26 and 28 are also connected to the furnace 12, preferably in series as illustrated, for receiving heated fluid from furnace 12 and heating a space such as the interior of a conventional building 30 in which the aforementioned radiators are disposed.

The heat transfer arrangement including the aforementioned radiators 18, 20, 22, 24, 26 and 28 is also connected to tank 16 for returning the fluid to the tank 16 and storing and recycling the fluid in such a manner that system 10 is in the form of a closed system. For this purpose, a pipe 32 connects radiator 18 to the outlet of furnace 12, while a pipe 34 connects radiator 18 to radiator 20. Similarly, a pipe 36 connects radiator 20 to radiator 22 and a pipe 38 connects radiator 22 to radiator 24. Joining with pipe 38 are a pair of parallel pipes 40 and 42 connected to respective ones of the radiators 26 and 28. The latter are connected together as by a length of pipe 44 in order to form a loop from pipe 38 through the radiators 26 and 28 and back to pipe 38. A pipe 46 connects radiator 24 to tank 16. Radiators 18, 20, 22 and 24 are each provided with a respective bypass line 48 including a valve 50 for permitting adjustment of the amount of fluid passed through the radiators 18, 20, 22 and 24 in order to balance the heat transfer arrangement formed by the radiators. In particular, it is advantageous if the valves 50 are conventional thermostatic valves which will automatically achieve the aforementioned balance of the system. Thus, by arranging the lines 48 in parallel with their associated radiators 18, 20, 22 and 24, an adjustment of the fluid flow through the system is permitted.

A conventional pump 52 is connected to pipe 46 and to a pipe 54 connected to tank 16 so as to be inserted between radiator 24, that being the last radiator in the serially connected string of radiators, for circulating the working fluid through the closed system. A pipe 56 connects tank 16 to the inlet of furnace 12. Further, tank 16 advantageously is provided with an inlet supply arrangement 58 disposed for adding fluid to the system in order to make up losses which naturally occur therein.

Figure 5:
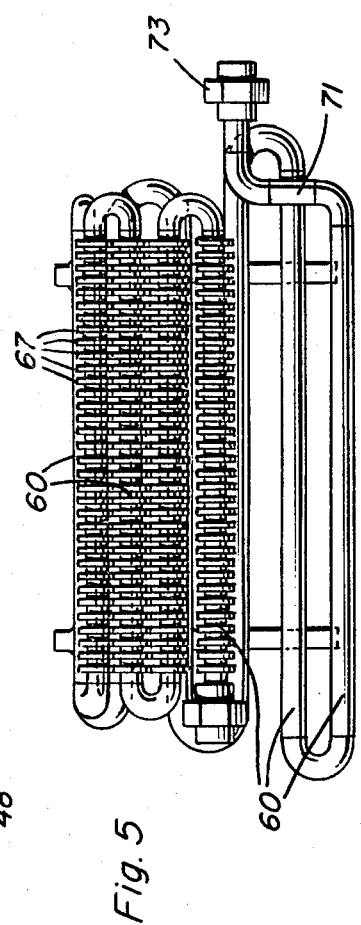
FIG. 5 is an enlarged plan view of the fireplace furnace.
Figure 3:
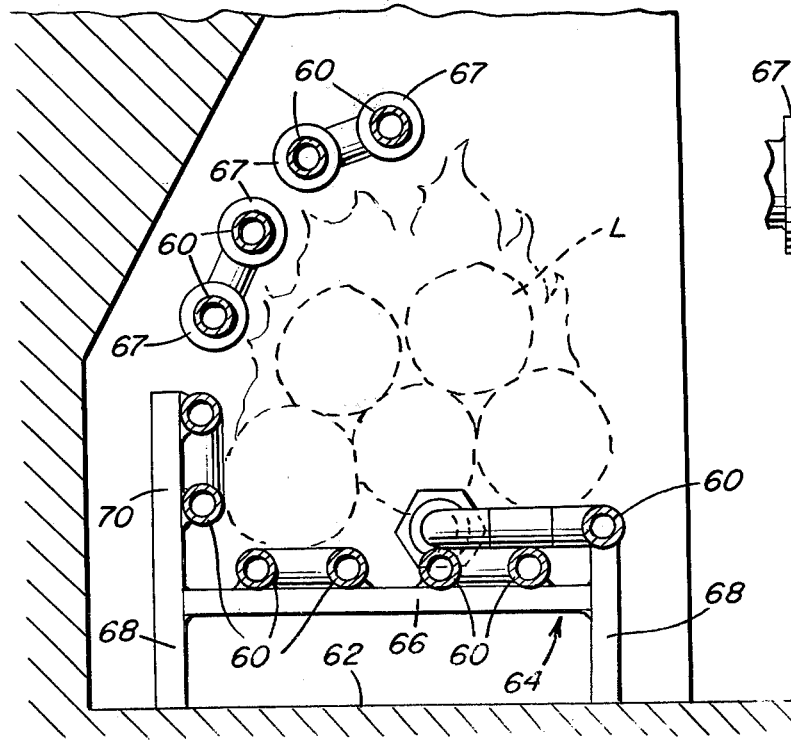
FIG. 3 is a fragmentary, enlarged, sectional view taken generally along the line 3—3 of FIG. 2.

As can be seen from FIGS. 2, 3 and 5 of the drawings, furnace 12 includes a continuous member bent into a plurality of horizontally extending coils 60 disposed above the hearth 62 of fireplace 14 for forming a tortuous flow path of the working fluid through fireplace 14. More specifically, furnace 12 includes a stand 64 supporting coils 60 and including a horizontal framework 66 supported by a plurality of legs 68. A pair, although the number may vary, of substantially vertical elements 70 extend from horizontal framework 66 so as to provide a supporting surface for a portion of the coils 60. That is, the coils 60 are arranged on both the framework 66 and element 70 for partially surrounding a fire built on the coils 60 as by means of the logs L. In this manner, it will be appreciated that the coils 60, in conjunction with stand 64, form a grate for a fire built in fireplace 14.

Figure 6:
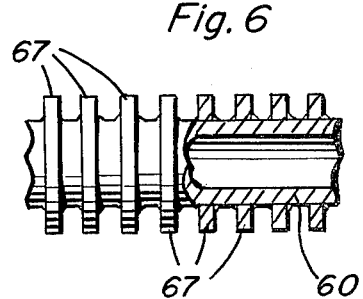
FIG. 6 is an enlarged part sectional view of one of the finned pipes of the fireplace furnace.

In order to provide a maximum heat transfer from a fire to the liquid in the coils, coils 60 are provided on three sides of the logs shown at L. Beneath the fire, four coils are provided, spaced laterally from and parallel to each other. These coils are connected to framework 66 by any suitable means, as for example, welding. Two vertically displaced coils 60 are attached to vertical element 70, also by any suitable means. Four additional coils are arranged in surmounting relation to the logs in the fireplace to utilize the heat rising therefrom. These coils are arranged with two coils displaced in a substantially vertical plane and two coils displaced in a substantially horizontal plane. All four coils are provided with annular fins 67 to enhance the heat exchange qualities of the coils. FIG. 6 shows these fins clearly. It may be seen that each fin comprises an open disk attached about the circumference of the coil by any suitable means, as for example welding. The disks are spaced along each coil and thereby provide additional surface area through which heat exchange may take place.

On forward legs 68, short upward extensions are provided for supporting forward coil 60 which includes a rearward extension 71 attached to which is outlet connector 73. An inlet connector is attached to the furnace at the topmost coil thus allowing a gravity feed of fluid through the furnace.

An auxiliary heater 72 is advantageously associated with the storage tank 16 in order to permit system 10 to maintain a constant temperature during, for example, the morning hours after a fire in fireplace 14 has gone out. Further, the provision of heater 72 gives the system 10 an emergency or standby capability in order to provide heat into the heat transfer arrangement, as well as possibly into the hot water taps of the structure, whenever the fireplace 14 could not be used for any reason, such as lack of appropriate fuel, or until such time as occupants of the building 30 would return and start a fire in fireplace 14. This heater 72 may be fueled as by a liquefied petroleum gas such as propane, butane, and the like, or by fuel or similar oil, and is of a construction well-known in the gas and oil heater arts. Further, heater 72 can be provided with a thermostat (not shown) set to come on automatically when the water temperature on, for example, the fire grate formed by furnace 12 drops to or below a predetermined temperature.

Figure 4:
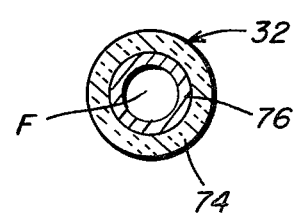
FIG. 4 is an enlarged, sectional view taken generally along the line 4—4 of FIG. 2.

In order to enhance the inherent efficiency of a system 10, the pipes connecting the radiators to one another and to the furnace 12 and tank 16 are advantageously provided with an outer layer of suitable insulation 74. As can be seen from FIG. 4, this insulation 74 surrounds a basic iron or steel pipe 76, and the like, in order to form a composite structure making up a pipe, specifically pipe 32 in this instance.

While the illustrated radiators 18, 20, 22, 24, 26 and 28 are conventional baseboard radiators, it is to be understood that other kinds of radiators, and other kinds of heat transfer devices, may be employed. For example, air could be employed in place of water as the heat transfer fluid F. Further, in the event all rooms or portions of the structure being heated have obtained a predetermined maximum temperature, the basic system will simply go to an off position by the opening of all the valves 50 to a position closing flow through the radiators and causing the fluid to pass around the radiators by means of the bypass lines 48. Of course, some of the valves 50 can be in the position bypassing fluid, while it is also possible to provide valves 50 which will have continuous operation and partially open and close in order to divert part of the fluid through an associated bypass line 48 and the remainder of the fluid through the associated radiator.

As can be appreciated from the above description and from the drawings, a fireplace heating system according to the present invention is of a simple yet rugged construction which provides for efficient use of heat generated by an open fire in a conventional fireplace. Further, by inclusion of the auxiliary heater 72, the system can easily be made into a continuous heating system which will constantly monitor the temperature of a room or rooms and maintain the temperature in the associated structure above a predetermined value.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fireplace heating system, comprising, in combination:
   (a) fireplace furnace means arrangeable in a fireplace for heating a fluid passing through the furnace means;
   (b) fluid storage means connected to the furnace means for feeding fluid to the furnace means and for providing a reservoir of heated fluid; and
   (c) heat transfer means connected to the furnace means for receiving heated fluid from the furnace means and heating a space in which the heat transfer means is disposed, the heat transfer means being a plurality of radiators connected to the fluid storage means for returning the fluid to the storage means and storing and recycling the fluid so as to form a closed fluid flow system, a pump being inserted between the heat transfer means and the fluid storage means for circulating fluid through the closed fluid flow system, with the storage means being provided with an inlet arranged for adding fluid to the system in order to make up losses, the heat transfer means including a like number of lines as radiators, the lines being connected in parallel with and bypassing the radiators for selectively permitting adjustment of fluid flow through the radiators, and a plurality of valves, each of the lines having one of the valves disposed therein for permitting adjustment of the amount of fluid passed through the radiators, the furnace means including a continuous member bent into a plurality of connected, horizontally extending coils disposed above a hearth of the fireplace for forming a continuous tortuous flow path of the fluid through the fireplace, and the furnace means further including a stand supporting the coils, the stand including a substantially horizontal framework, legs supporting the framework, and a substantially vertically disposed element extending from the framework, with at least some of the coils being arranged extending horizontally on both the framework and along the vertically disposed element for partially surrounding on two sides a fire built on the coils and the remainder of the coils extending above and laterally from said vertically disposed element for partially covering the top of a fire built on the coils, the coils disposed forming a grate for the fire in the fireplace.

2. The system of claim 1 wherein said remainder of coils include a plurality of heat exchange disks connected to a portion of each coil with each heat exchange disk surrounding the periphery of a coil.

* * * * *

UNITED STATES PATENT AND TRADEMARK OFFICE
CERTIFICATE OF CORRECTION

PATENT NO. : 4,258,880
DATED : March 31, 1981
INVENTOR(S) : ERNEST W. WILLIAMSON It is certified that error appears in the above-identified patent and that said Letters Patent are hereby corrected as shown below:

IN THE TITLE, LINE 2, CANCEL "OR" AND INSERT --ON--.

Signed and Sealed this

Thirtieth Day of June 1981

[SEAL]

Attest:

RENE D. TEGTMEYER

Attesting Officer

Acting Commissioner of Patents and Trademarks